No. 749,450.                                              Patented January 12, 1904.

UNITED STATES PATENT OFFICE.

WILDER W. RUSSELL, OF BAYONNE, NEW JERSEY.

WALL-WASH.

SPECIFICATION forming part of Letters Patent No. 749,450, dated January 12, 1904.

Application filed January 21, 1901. Serial No. 44,642. (No specimens.)

*To all whom it may concern:*

Be it known that I, WILDER W. RUSSELL, a citizen of the United States, residing in the city of Bayonne, in the county of Bergen and State of New Jersey, have invented a new and useful Improvement in Wall-Washes, of which the following is a specification.

My invention relates to washes for walls and the interior surfaces of buildings, and is designed to entirely cover the same in the same manner as whitewash, calcimine, or paint.

My composition consists of the following ingredients, combined in about the following proportions: oxid of zinc, two hundred pounds; paris-white, (or other form of whiting,) two hundred pounds; linseed-oil, eight gallons; varnish, (copal,) eight gallons; glue, (animal or vegetable,) eight pounds; water, (preferably soft,) twenty gallons; powdered pumice-stone, (white,) thirty pounds. These ingredients should be thoroughly mixed in any suitable mixing apparatus in the following manner: The eight pounds of glue should first be dissolved in water, about five gallons of the water being thus employed, and the liquid should be previously heated. A part of the zinc, preferably about one hundred pounds, is then put into the mixer, and the glue dissolved in water is added. The mass is then stirred until it is fairly well mixed. The stirring is still continued, and there is slowly added to the mass the linseed-oil and a further proportion of the zinc, if necessary, sufficient to keep the mass to the consistency of thin cream. In practice it has been found that one hundred pounds of the zinc is about what is required for this purpose; but it may happen that a little more may be required. After all the oil has been added the varnish is slowly added and the remainder of the zinc and the whiting or terra-alba likewise until all the varnish has been so used. Then the pumice-stone, which should be very finely ground, and the balance of the water is added. It may be desirable to add some of the pumice-stone before all of the whiting is added. The order of their addition is not essential. After this has been done the mixer is allowed to run a sufficient length of time to make the composition uniform in appearance and of a dull even color, which indicates that the ingredients have become thoroughly incorporated and combined. When the mixing operation is completed, the result should be a heavy semiliquid paste. From one and a half to two hours is usually ample time to accomplish this purpose; but when different pigments are employed the precise time necessary may be ascertained in each instance by previous experiment.

The result of the foregoing series of operations is a dull white compound. When it is desirable to produce wall-washes of other colors, suitable pigments may be employed for that purpose and a sufficient quantity to produce the desired color may be added after the varnish has been fed into the mixer and may be either additional to the amount of zinc and whiting employed or may take the place of an equivalent part, by weight, of the zinc and whiting. When it is desired to produce a red color, oxid of iron is substituted for oxid of zinc, and terra-alba as a substitute for the whiting. The proportion of these two ingredients to each other determines the depth of the color of the resulting mass.

The composition above described is placed upon a wall or other surface by means of an ordinary paint-brush and requires little skill in its application. It hardens into a firm compact even surface, which is impervious to moisture under ordinary conditions and has a beautifully soft amorphous appearance.

Modications may be made in some of the ingredients of my composition without departing from the principles under which it is manufactured. Other pigments may be substituted for zinc, iron, whiting, or terra-alba, as the case may be, and other oils possessing similar properties for linseed-oil, and other forms of varnish may likewise be employed; but the proportions which I have set out above are those which in my experience produce the most satisfactory result.

What I claim as new is—

1. A composition of matter consisting of equal parts by measure of linseed-oil and varnish, a volume of soft water slightly greater than that of the oil and varnish combined, equal parts by weight of oxid of zinc and whiting, a small portion of powdered pumice and a yet smaller portion of glue.

2. A composition of matter consisting of the following ingredients in the proportions named, to wit; about two hundred pounds of oxid of zinc, the same weight of whiting or terra-alba, about one-seventh of that weight of powdered pumice-stone and a small proportion of glue, in combination with eight gallons of linseed-oil and the same quantity of varnish.

3. The process of making a wall-wash which consists first, in dissolving about eight pounds of glue in five gallons of water, second in slowly mixing therewith about one and one-half times as much linseed-oil as water and about twelve and one-half times as much oxid of zinc as glue; third, in adding thereto about as much varnish and oxid of zinc as of the previous lot of linseed-oil and zinc and about twice as much whiting and terra-alba as zinc in either lot; fourth, in adding thereto about four times as much powdered pumice as the original amount of glue, and fifth, in mixing the mass to a uniform consistency.

Witness my hand this 19th day of January, 1901, in the presence of two subscribing witnesses.

WILDER W. RUSSELL.

Witnesses:
 HERMAN MEYER,
 MABEL K. WHITMAN.